(12) United States Patent
Mattarella-Micke et al.

(10) Patent No.: US 11,563,846 B1
(45) Date of Patent: Jan. 24, 2023

(54) SYSTEM AND METHOD FOR PREDICTING INTELLIGENT VOICE ASSISTANT CONTENT

(71) Applicant: Intuit Inc., Mountain View, CA (US)

(72) Inventors: Andrew Mattarella-Micke, Menlo Park, CA (US); Neo Yuchen, Arcadia, CA (US); Xiaoyu Zeng, San Jose, CA (US); Manisha Panta, New Orleans, LA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/829,111

(22) Filed: May 31, 2022

(51) Int. Cl.
*H04M 3/42* (2006.01)
*H04M 3/523* (2006.01)
*G10L 17/02* (2013.01)
*G10L 17/24* (2013.01)
*G10L 17/06* (2013.01)

(52) U.S. Cl.
CPC ......... *H04M 3/42025* (2013.01); *G10L 17/02* (2013.01); *G10L 17/06* (2013.01); *G10L 17/24* (2013.01); *H04M 3/523* (2013.01)

(58) Field of Classification Search
CPC ... H04M 3/42025; H04M 3/523; G10L 17/02; G10L 17/06; G10L 17/24
See application file for complete search history.

(56) References Cited

U.S. PATENT DOCUMENTS

| 7,873,151 | B1 * | 1/2011 | Bauer | H04M 15/751 |
| | | | | 379/114.15 |
| 8,055,243 | B2 * | 11/2011 | Li | H04L 51/224 |
| | | | | 455/412.2 |
| 2007/0073542 | A1 * | 3/2007 | Chittaluru | G10L 13/07 |
| | | | | 704/260 |
| 2008/0144788 | A1 * | 6/2008 | You | H04L 12/66 |
| | | | | 379/93.15 |
| 2014/0247926 | A1 * | 9/2014 | Gainsboro | G10L 15/26 |
| | | | | 379/88.01 |

FOREIGN PATENT DOCUMENTS

| CN | 105306657 A | * | 2/2016 | ............ G06F 3/167 |
| WO | WO-2015054531 A1 | * | 4/2015 | ........... H04L 61/106 |
| WO | WO-2022060970 A1 | * | 3/2022 | ......... G06K 9/00362 |

* cited by examiner

*Primary Examiner* — Akelaw Teshale
(74) *Attorney, Agent, or Firm* — Ferguson Braswell Fraser Kubasta PC (57) ABSTRACT

A method including receiving an incoming call from a calling device of a caller and determining identification information for the calling device. The method also includes receiving voice audio data of the caller from the calling device, converting the voice audio data to caller phones, and identifying a customer account associated with the identification information. The method further includes obtaining user phones for multiple candidate users associated with the identified customer account, comparing the caller phones to the user phones for the multiple candidate users, and determining the identity of the caller based on the comparison.

20 Claims, 6 Drawing Sheets

SYSTEM AND METHOD FOR PREDICTING INTELLIGENT VOICE ASSISTANT CONTENT

BACKGROUND

Prior to the introduction of intelligent voice assistant (IVA) systems in many small businesses, when a customer needed to be identified, a human operator would ask verbal questions to identify the customer and match the customer to an existing directory record. In modern IVA systems, there are many speech-to-text models based on machine learning that can administer such questions. However, many of these systems suffer from low accuracy. As a result, a customer wastes time repeating and spelling out his or her identity to an IVA system only to repeat the process with a human agent.

SUMMARY

It is an aspect of the present disclosure to provide a method including receiving an incoming call from a calling device of a caller and determining identification information for the calling device. The method also includes receiving voice audio data of the caller from the calling device, converting the voice audio data to caller phones, and identifying a customer account associated with the identification information. The method further includes obtaining user phones for multiple candidate users associated with the identified customer account, comparing the caller phones to the user phones for the multiple candidate users, and determining the identity of the caller based on the comparison.

It is another aspect of the present disclosure to describe an intelligent voice assistant (IVA) system that includes an incoming call response controller that receives an incoming call from a calling device of a caller, determines identification information for the calling device, and identifies a customer account associated with the identification information. The IVA system also includes a caller voice capture controller that receives voice audio data of the caller from the calling device, a caller audio controller that converts the voice audio data to caller phones, and a customer records controller that obtains user phones for multiple candidate users associated with the identified customer account. The IVA system further includes an audio comparison controller that compares the caller phones to the user phones for the multiple candidate users and determines the identity of the caller based on the comparison.

It is another aspect of the disclosure to provide a method including receiving an incoming call from a calling device of a caller, determining identification information for the calling device, and identifying a customer account associated with the identification information. The method also includes prompting the caller to state a pre-defined phrase, receiving voice audio data of the caller from the calling device, and converting the voice audio data to caller phones. The method further includes obtaining user phones for multiple candidate users associated with the identified customer account. Obtaining user phones includes at least one of: i) retrieving stored user phones for each of the multiple candidate users; or ii) converting user text data associated with each of the multiple candidate users to user graphemes and converting a user grapheme to a user phone for each of the plurality of candidate users. The method includes comparing the caller phones to the user phones for the multiple candidate users and determining the identity of the caller based on the comparison.

Other aspects of the invention will be apparent from the following description and the appended claims.

BRIEF DESCRIPTION OF DRAWINGS

Specific embodiments of the invention will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The disclosed system and method improve the accuracy of details recorded by intelligent voice assistant (IVA) systems, thereby reducing the time users spend on the phone. The disclosed system and method utilize phonetic (speech-sound based) representations at the transcription and alignment stages of the recognition process. The disclosed algorithm uses speech-to-phone (from caller audio) and text-to-phone (from existing written records) models to generate a shared auditory representation which can be used to identify caller (i.e., customer) information within the IVA system.

The individual speech sounds that distinguish spoken words are phonemes. A phoneme is therefore the smallest contrastive sound unit of a language. The individual letters or groups of letters that represent the individual speech sounds are called graphemes. Thus, a grapheme is the smallest fundamental unit in written language. In sum, phonemes represent sounds while graphemes include alphabetical letters, characters, numerical digits, and the like. In the embodiments described herein, written text in memory is stored in English and voice messages are spoken in English also. However, this is by way of example only and should not be construed to limit the scope of the disclosure and the claims herein. The teachings of the present disclosure may be used to process incoming calls from callers that speak languages other than English, or for information (e.g., names) based in a different phonemic system. In addition to phonemes, language acoustics can also be recorded as "phones", the smallest sound unit of a language (whether it distinguishes a word or not in that language). Phonemes are therefore a subset of phones. The disclosed system and method can be embodied using either sound representation. However, for the purposes of enabling the disclosed system and method and defining the scope of the claims herein as broadly as possible, the descriptions that follow are directed to an embodiment that uses phones to identify callers.

A primary implementation of the disclosed system and method is targeted at identifying the name of a caller. Specifically, the IVA system takes the audio of the caller pronouncing his or her name and transcribes International Phonetic Alphabet (IPA) phones. At the same time, the IVA system determines the list of potential names (i.e., candidate users) of the caller interacting with the IVA system based on the phone number of the calling phone or other device (e.g., caller ID) and generates an IPA transcription of the text-based candidate user names Since the IVA system converts both the spoken name and written text names to a shared auditory space, the disclosed system and method then determines the most-likely customer name based on closest auditory similarity.

The disclosed system and method implement a contact prediction algorithm that includes four operations. In a first operation, the incoming caller audio is converted to IPA phones using a pre-trained phonetic transcription model (e.g., 6-layer long short-term memory (LSTM) in a neural network architecture). In a second operation, a phone representation is derived from the text, via a grapheme-to-phone translation (e.g., a text-to-phone mapping, with ambiguities resolved based on part of speech tags, or a pre-trained ML model). In a third operation, spoken and textual originating phone representations are compared (in a one-to-many fashion). In a fourth operation, the closest customer name on record is identified based on a distance metric (e.g., Jaccard or Levenshtein distances).

The disclosed system and method are a novel and non-trivial combination of methods, which also leverage some of the advantages of data from the IVA system to make it viable. Specifically, although extracting the speech sounds of the caller audio and the customer text are two distinct and individually useful tasks, these operations have not been combined for record identification. This is because such systems would be less accurate relative to direct speech-to-text systems when applied to the task of transcription for generic language. However, record identification in particular is an ideal application for the disclosed system and method, because the out-of-vocabulary problem is highly common and because the potential transcriptions can be narrowed down to a smaller subset. In particular, the disclosed system and method use a caller's phone number to restrict the potential candidates, thereby making grapheme-to-phone transcription practical from a computational standpoint and reducing false positives from multiple candidate comparisons.

Figure 1:
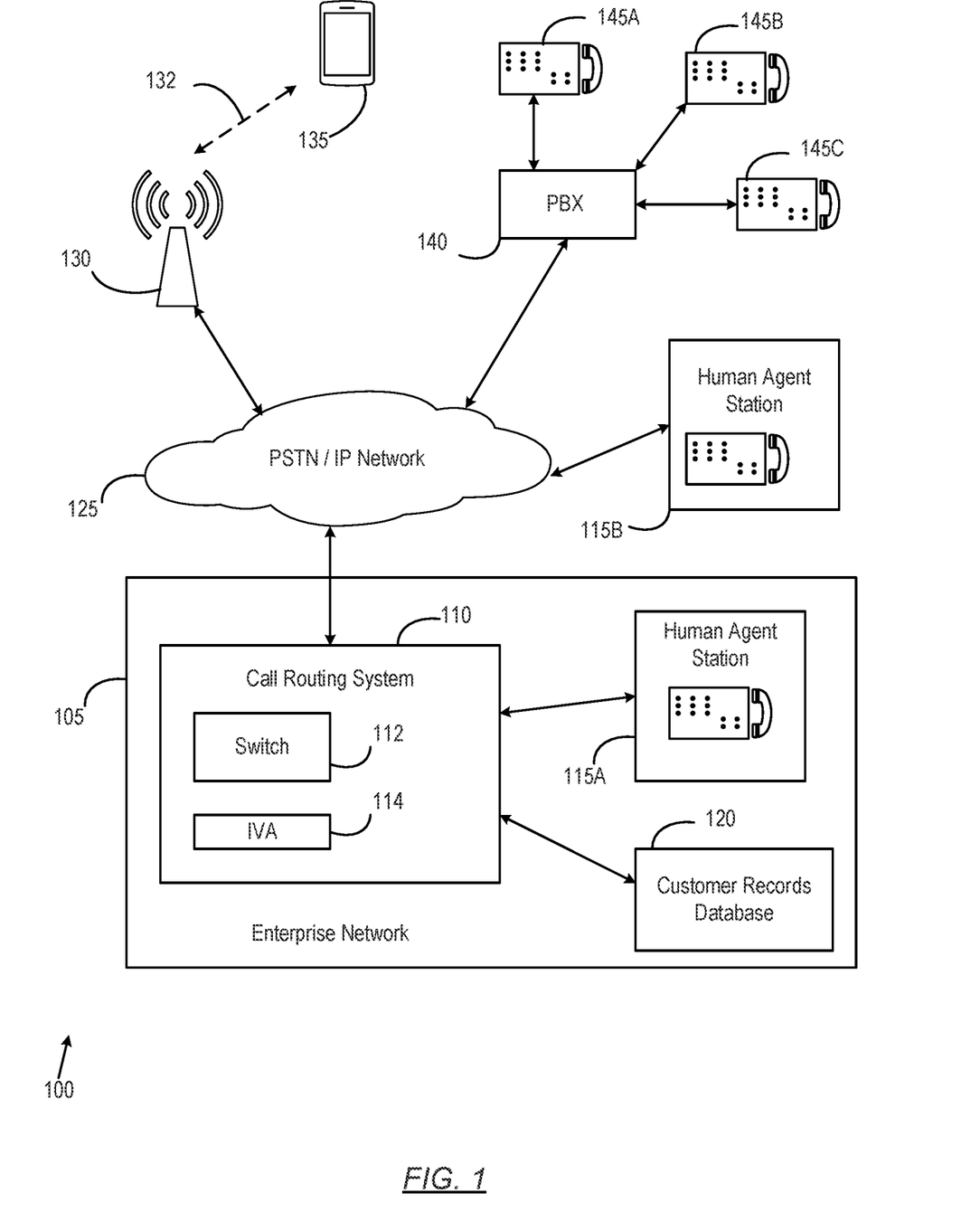
FIG. 1 shows a communication system in accordance with disclosed embodiments.

FIG. 1 shows a system 100 in accordance with disclosed embodiments. The system 100 comprises a call routing system 110 that receives incoming phone calls from caller devices via a communication network 125. In an example embodiment, the call routing system 110 may part of an enterprise network 105 that is operated by a service provider, such as a software-as-a-service (SaaS) company. The enterprise network 105 also includes a customer records database (DB) 120 and one or more human agents stations, such as local human agent station 115A and remote human agent station 115B. Among other operations, the call routing system 110 may direct incoming calls to the local human agent station 115A within the enterprise network 105. Alternatively, the call routing system 110 may direct incoming calls to the remote human agent station 115B via the communication network 125.

The communication network 125 may be based on any conventional network architecture. In one example embodiment, the communication network 125 may be a circuit-switched system, such as a public switched telephone network (PSTN). In another example, the communication network 125 may be a packet-switched system, such as an Internet protocol (IP) network. In another example, the communication network 125 may comprise elements from both the PSTN and the Internet.

The calling devices may include conventional wireline phones, such as desk phones 145A, 145B, and 145C, which access the communication network 125 via a private branch exchange (PBX) 140. The calling devices also may include mobile devices, such as mobile phones, tablets, and laptop computers. An exemplary mobile device is mobile phone 135, which accesses the communication network 125 via a wireless access point 130. In an example embodiment, the wireless access point 130 may be a base station of a cellular telephone network.

The call routing system 110 comprises a switch 112 and an intelligent voice assistant (IVA) 114 that receive the incoming calls from communication network 125 and direct the incoming calls to the human agent stations 115A and 115B. The switch 112 may be any conventional switching fabric that comprises a combination of hardware and software that directs incoming calls received by call routing system 100 to the correct output port that communicates with the next node in the system 100.

In an embodiment, the IVA 114 is configured to communicate with a caller using, for example, mobile phone 135 in order to prompt the caller to speak a predetermined word or phrase. In a typical embodiment, the IVA 114 prompts the caller to state his or her name. In alternate embodiments, the IVA 114 may ask the caller to state other unique information, such as a caller street address, a social security number, a phone extension in PBX 140, and so forth. According to the principles of the present disclosure, the IVA 114 is configured to convert the spoken audio data of the caller into caller phones. The IVA 114 is further configured to use identifying information of the calling device (e.g., phone number) to access a customer record in customer records DB 120 and to retrieve or generate candidate user phones from the customer record for a plurality of candidate users. The IVA 114 then compares the caller phones to multiple ones of the candidate user phones to determine a candidate user having the closest matching candidate user phones. The IVA 114 then identifies the candidate user having the closest matching candidate user phones as the user.

Figure 2:
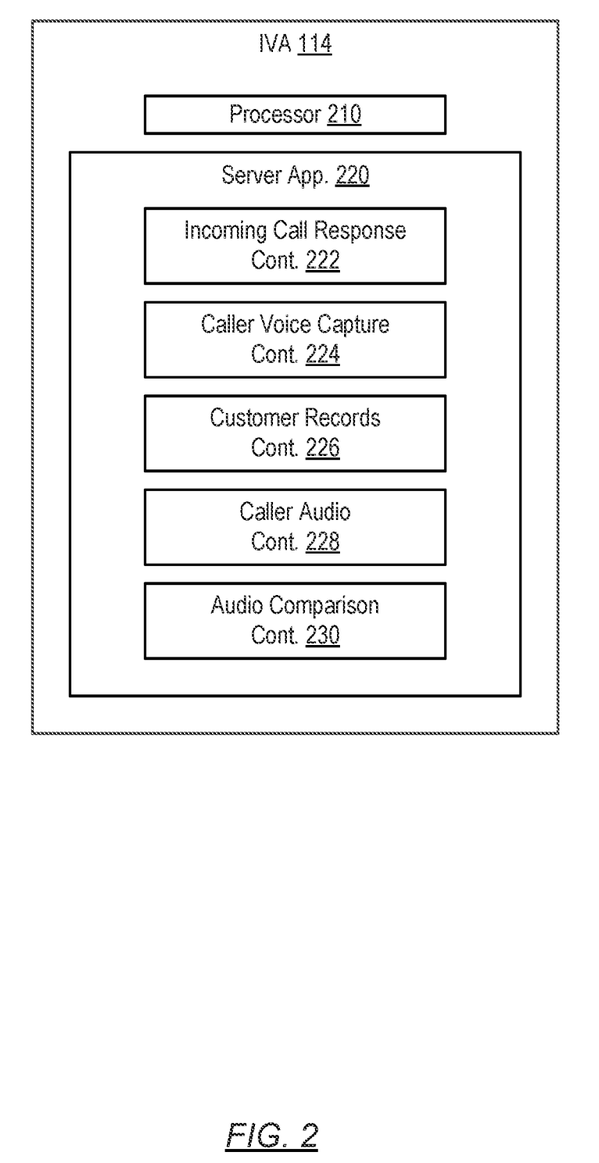
FIG. 2 shows an intelligent voice assistant (IVA) system in accordance with disclosed embodiments.

FIG. 2 shows an intelligent voice assistant (IVA) 114 in accordance with disclosed embodiments. IVA 114 comprises processor 210 and server applications 220. The server applications 220 include a plurality of controllers that comprise software applications executed by the processor 210 in order to perform the basic functions of IVA 114. The server applications 220 include incoming call response controller 222, caller voice capture controller 224, customer records controller 226, caller audio controller 228, and audio comparison controller 230.

The incoming call response controller 222 detects and answers an incoming call, identifies the calling device (e.g., mobile device 135) using, for example, the phone number of the calling device or a network address associated with the calling device. The incoming call response controller 222 also identifies a customer account in the customer records DB 120 using the identifying information of the calling device. By way of example, the incoming call response controller 222 may use the calling device phone number to identify the correct customer account.

After the call is answered, the caller voice capture controller 224 prompts the caller to speak unique identifying information, such as the name of the caller, the caller's street address, the caller's social security number, and the like. The caller voice capture controller 224 is configured to record the spoken response of the caller for subsequent audio processing. The caller audio controller 228 is configured to convert the recorded spoken response of the caller into caller phones according to the principles of the present disclosure.

The customer records controller 226 accesses the customer account identified by the incoming call response controller 222 to retrieve from the identified customer account the text names of a plurality of users associated with the identified customer account. The customer records controller 226 is configured to convert the user text names to graphemes and then to convert the user graphemes to user phones Finally, the audio comparison controller 230 is configured to compare the caller phones from the incoming call to the user phones for the plurality of users associated with the identified customer account. The comparison operation determines the user phones that are the closest match to the caller phones using, for example, a distance metric (e.g., Jaccard, Levenshtein, etc.).

Figure 3:
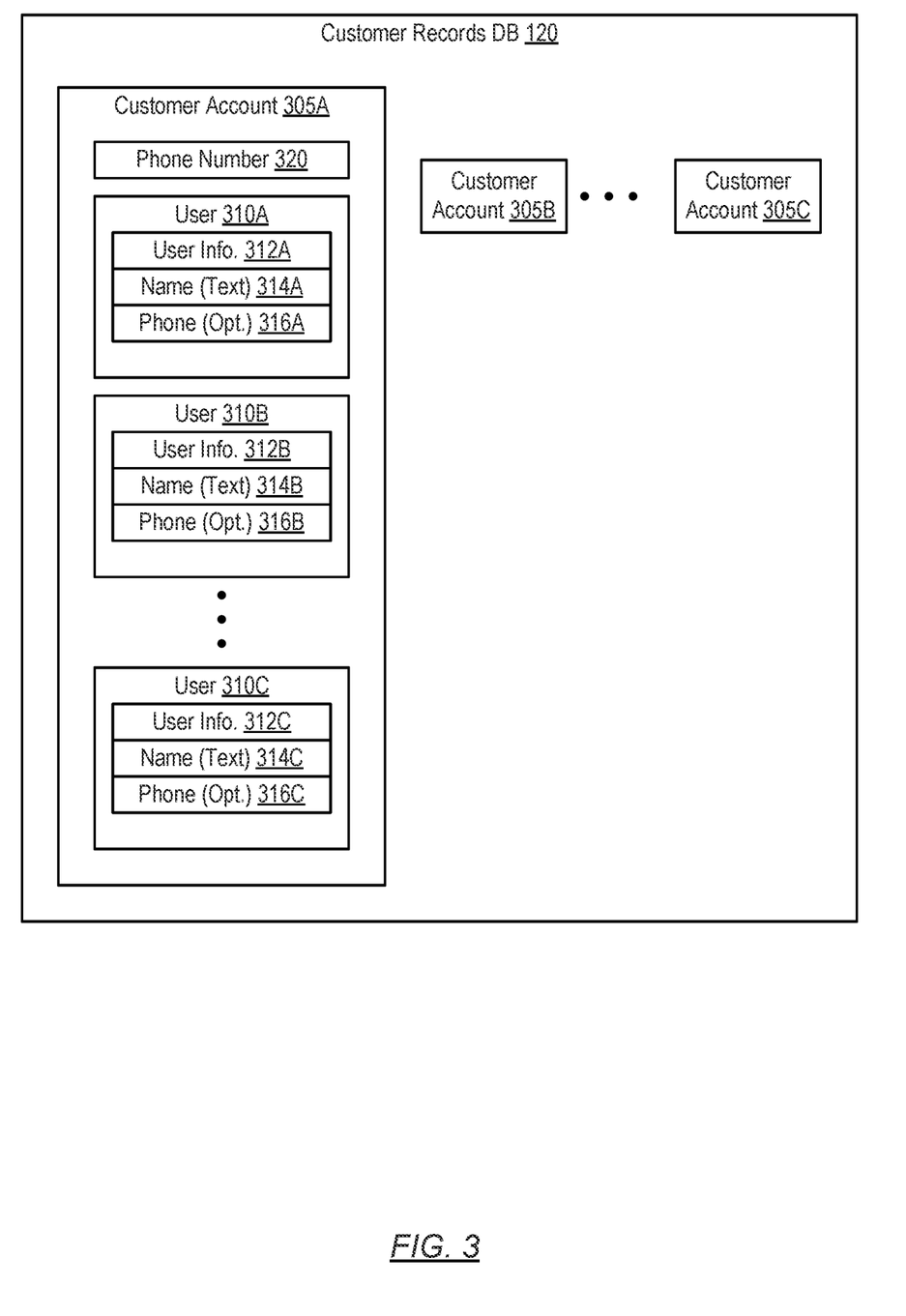
FIG. 3 shows a customer records database in accordance with disclosed embodiments.

FIG. 3 shows a customer records database (DB) 120 in accordance with disclosed embodiments. The customer records database DB 120 includes records 305 for a plurality of customer accounts, such as customer account record 305A, customer account record 305B, and customer account record 305C. Each customer account record 305 comprises an account phone number 320 associated with the customer account record 305. By way of example, the customer account record 305 for a business enterprise that owns PBX 140 stores the phone number of the PBX 140 in the account phone number 320.

A large number of users may be associated with a customer account record 305A. By way of example, the business enterprise that owns PBX 140 may have 50 employees, each of which may be a user of the PBX 140. In such a situation, the customer account record 305A may include a user record for each of the 50 users, such as user record 310A, user record 310B, and user record 310C. Each user record 310 includes a user information field 312, such as example user information fields 312A, 312B, and 312C. The user information fields 312 contain information about each user, such as home or work address, job title, etc.

Each user record 310 also includes a name (text) field 314, such as example name (text) fields 314A, 314B, and 314C. According to the principles of the disclosure, the IVA 114 retrieves the textual name data in the name (text) field 314 of a candidate user and converts the retrieved text to user graphemes that are subsequently converted to user phones. Optionally, each user record 310 also includes a user phone field 316, such as example user phone fields 316A, 316B, and 316C. Once the textual name data of a candidate user is converted to candidate user phones, the candidate user phones may be stored in user phone field 316 for later use in subsequent phone calls. In an alternative embodiment of this system, phone field 316 could be populated from phones extracted from previous call audio.

Figure 4:
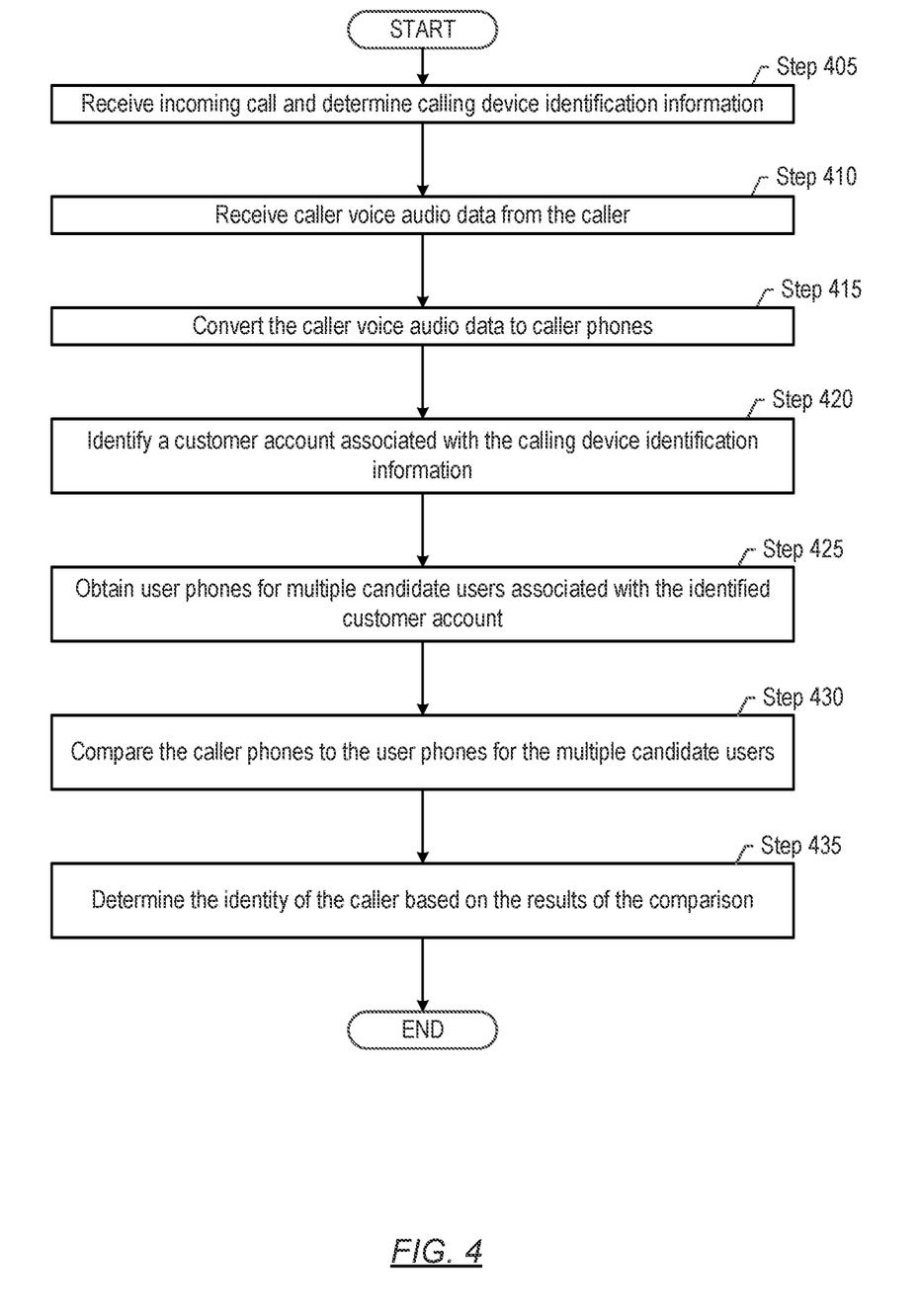
FIG. 4 shows a flowchart in accordance with disclosed embodiments.

FIG. 4 shows a flowchart in accordance with disclosed embodiments. In step 405, the IVA 114 receives an incoming call and determines the calling device identification information associated with the call. In step 410, the IVA 114 receives caller voice audio data from the caller. In step 415, the IVA 114 converts the caller voice audio data to caller phones. In step 420, the IVA 114 identifies a customer account associated with the calling device identification information.

In step 425, the IVA 114 obtains user phones for multiple candidate users associated with the identified customer account. Next, in step 430, the IVA 114 compares the caller phones to the user phones for the multiple candidate users. In step 435, the IVA 114 determines the identity of the caller based on the results of the comparison.

As noted above, a primary implementation of the disclosed system and method identifies the name of a caller. Specifically, the IVA 114 captures the audio date of a caller pronouncing his or her name and transcribes International Phonetic Alphabet (IPA) phones (or phones). At the same time, the IVA 114 determines the candidate users of the customer account based on the phone number of the calling phone or other device (e.g., caller ID) and generates an IPA transcription of the text-based candidate user names. The IVA 114 converts both the spoken name of the caller and the written text names of the candidate users to a shared auditory space (i.e., phones). The disclosed system and method then determine the most-likely customer name based on closest auditory similarity.

Figure 5:
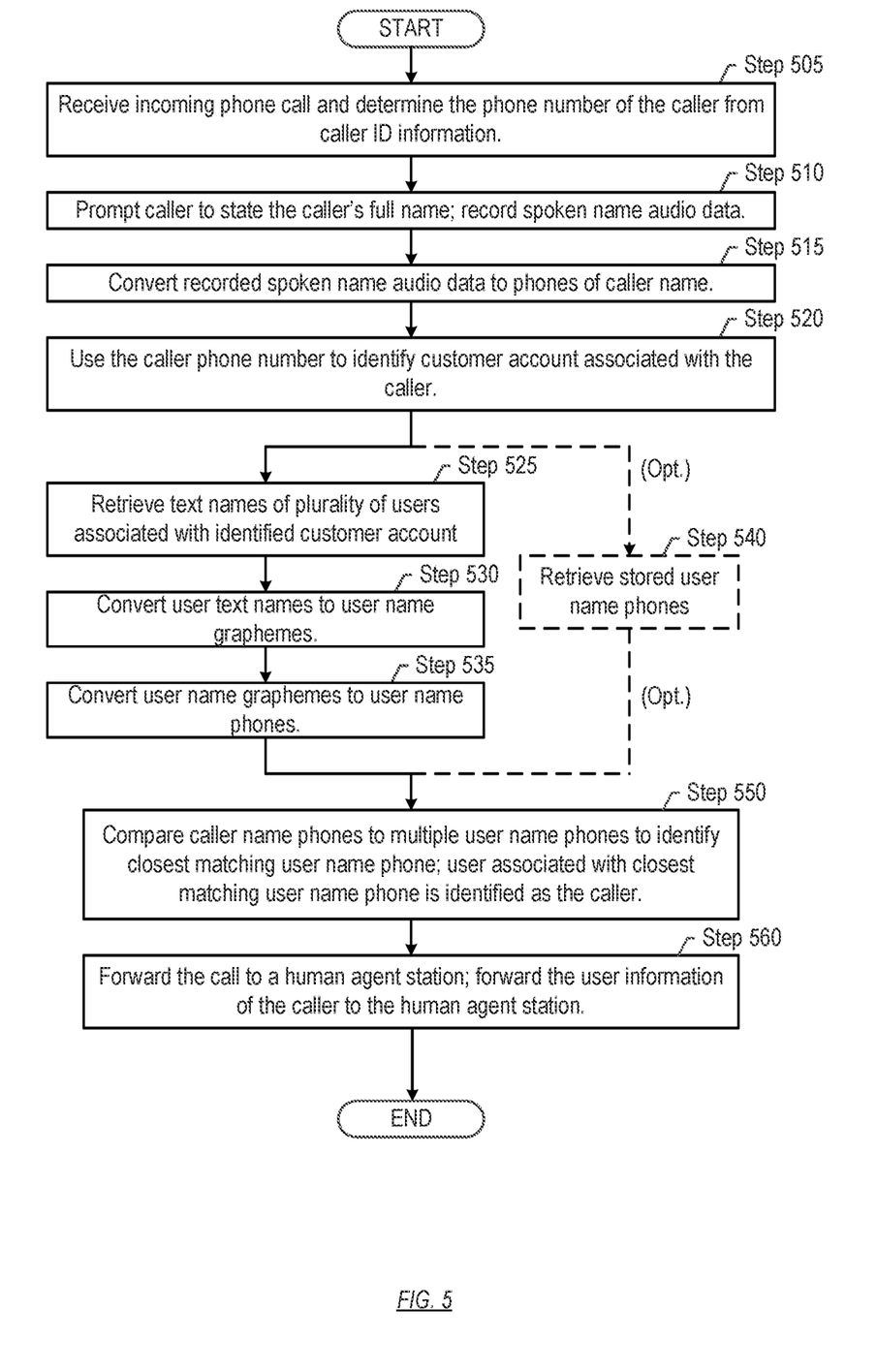
FIG. 5 shows a flowchart in accordance with disclosed embodiments.

FIG. 5 shows a flowchart in accordance with disclosed embodiments. In step 505, the IVA 114 receives an incoming phone call and determines the phone number of the caller from the caller ID information. In step 510, the IVA 114 prompts the caller to state the caller's full name. The IVA 114 records the spoken name audio data. In step 515, the IVA 114 converts the recorded spoken name audio data into phones representing the spoken caller name.

In step 520, the IVA 114 uses the caller phone number to identify a customer account associated with the caller. In step 525, the IVA 114 retrieves multiple text names for multiple users associated with the identified customer account. In step 530, the IVA 114 converts the multiple user text names into multiple name graphemes. In step 535, the IVA 114 converts the multiple user name graphemes into multiple user name phones.

Optionally, the IVA 114 may store in the customer records database 120 user name phones that were generated during previous phone calls or during an account setup procedure. In such an optional embodiment, step 540 (indicated by dotted lines) may replace steps 525, 530, and 535. In step 540, the IVA 114 retrieves the stored user name phones from the database 120.

In step 550, the IVA 114 compares the caller name phones to multiple user name phones (either generated in step 535 or retrieved in step 540) to identify a closest matching user name phone. The user associated with closest matching user name phone is identified as the caller. In step 560, the IVA 114 forwards the call to a human agent station and forwards the user information of the identified caller to the human agent station 115A.

Figure 6A:
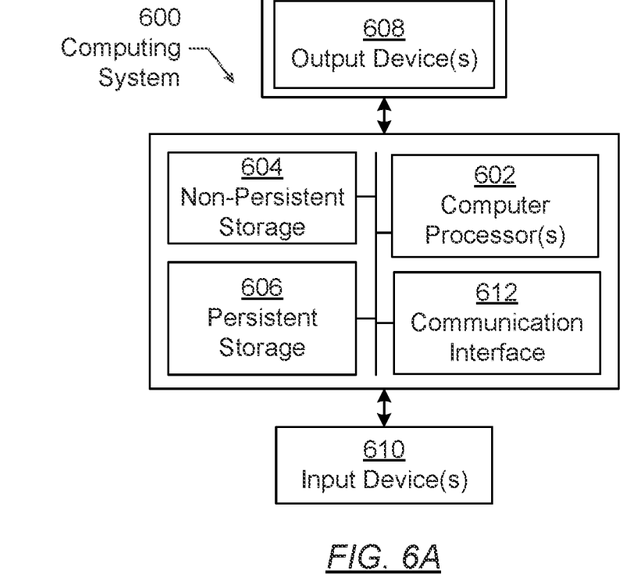
FIG. 6A shows computing systems in accordance with disclosed embodiments.
Figure 6B:
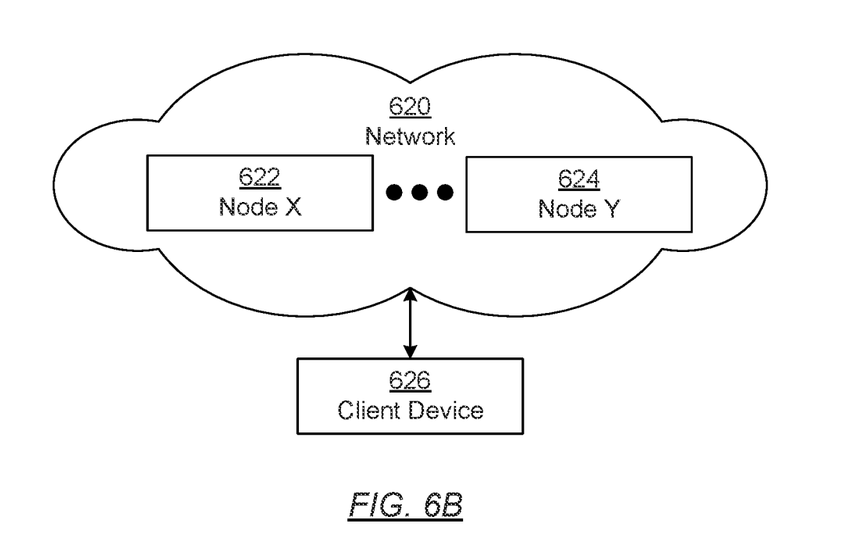
FIG. 6B shows computing systems in accordance with disclosed embodiments.

FIG. 6A and FIG. 6B show computing systems in accordance with disclosed embodiments. Embodiments disclosed herein may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments disclosed herein.

The computing system or group of computing systems described in FIG. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 6A and the nodes and/or client device in FIG. 6B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving an incoming call from a calling device of a caller;
determining identification information for the calling device based on a telephone number of the caller;
receiving voice audio data of the caller from the calling device;
converting the voice audio data to caller phones, wherein the caller phones comprise sound units of a language, and wherein the caller phones are converted into an International Phonetic Alphabet (IVA) format;
identifying a customer account associated with the identification information;
obtaining, using a grapheme-to-phone translation, user phones in the IVA format for a plurality of candidate users associated with the identified customer account;
comparing the caller phones to the user phones for the plurality of candidate users; and
determining the identity of the caller based on the comparison.

2. The method of claim 1, wherein the identification information is a phone number associated with the calling device.

3. The method of claim 2, wherein the voice audio data comprises a pre-defined phrase.

4. The method of claim 3, wherein the pre-defined phrase is a name of the caller.

5. The method of claim 1, wherein obtaining user phones for the plurality of candidate users comprises retrieving stored user phones for each of the plurality of candidate users.

6. The method of claim 1, wherein obtaining user phones for the plurality of candidate users further comprises converting user text data associated with each of the plurality of candidate users to user graphemes.

7. The method of claim 6, wherein obtaining user phones for the plurality of candidate users further comprises converting a user grapheme to a user phone for each of the plurality of candidate users.

8. The method of claim 7, wherein determining the identity of the caller based on the comparison comprises identifying a closest user name based on a distance metric.

9. The method of claim 1, further comprising directing the incoming call to a human agent based on the identity of the caller.

10. An intelligent voice assistant system comprising:
an incoming call response controller configured to receive an incoming call from a calling device of a caller, determine identification information for the calling device, and identify a customer account associated with the identification information;
a caller voice capture controller configured to receive voice audio data of the caller from the calling device;
a caller audio controller configured to convert the voice audio data to caller phones, wherein the caller phones comprise sound units of a language, and wherein the caller phones are converted into an International Phonetic Alphabet (IVA) format;
a customer records controller configured to obtain, using a grapheme-to-phone translation, user phones in the IVA format for a plurality of candidate users associated with the identified customer account; and
audio comparison controller configured to compare the caller phones to the user phones for the plurality of candidate users and determine the identity of the caller based on the comparison.

11. The intelligent voice assistant system of claim 10, wherein the identification information is a phone number associated with the calling device.

12. The intelligent voice assistant system of claim 11, wherein the voice audio data comprises a pre-defined phrase.

13. The intelligent voice assistant system of claim 12, wherein the pre-defined phrase is a name of the caller.

14. The intelligent voice assistant system of claim 10, wherein the customer records controller obtains user phones for the plurality of candidate users by retrieving stored user phones for each of the plurality of candidate users.

15. The intelligent voice assistant system of claim 10, wherein the customer records controller obtains user phones for the plurality of candidate users by converting user text data associated with each of the plurality of candidate users to user graphemes.

16. The intelligent voice assistant system of claim 15, wherein the customer records controller obtains user phones for the plurality of candidate users by converting a user grapheme to a user phone for each of the plurality of candidate users.

17. The intelligent voice assistant system of claim 16, wherein the audio comparison controller determines the identity of the caller based on the comparison by identifying a closest user name based on a distance metric.

18. The intelligent voice assistant system of claim 10, wherein the audio comparison controller is further configured to direct the incoming call to a human agent based on the identity of the caller.

19. A method comprising:
  receiving an incoming call from a calling device of a caller;
  determining identification information for the calling device and identifying a customer account associated with the identification information;
  prompting the caller to state a pre-defined phrase and receiving voice audio data of the caller from the calling device;
  converting the voice audio data to caller phones, wherein the caller phones comprise sound units of a language, and wherein the caller phones are converted into an International Phonetic Alphabet (IVA) format;
  obtaining, using a grapheme-to-phone translation, user phones in the IVA format for a plurality of candidate users associated with the identified customer account, wherein obtaining user phones comprises at least one of:
    retrieving stored user phones for each of the plurality of candidate users; or
    converting user text data associated with each of the plurality of candidate users to user graphemes and converting a user grapheme to a user phone for each of the plurality of candidate users;
  comparing the caller phones to the user phones for the plurality of candidate users; and
  determining the identity of the caller based on the comparison.

20. The method of claim 19, wherein the identification information is a phone number associated with the calling device and the pre-defined phrase is a name of the caller.

* * * * *